(12) United States Patent
Richter

(10) Patent No.: US 9,344,136 B2
(45) Date of Patent: May 17, 2016

(54) MOBILE TELEPHONE HOLDER WITH CHARGING FUNCTION

(71) Applicant: Harald Richter, Engelsbrand (DE)

(72) Inventor: Harald Richter, Engelsbrand (DE)

(*) Notice: Subject to any disclaimer, the term of this patent is extended or adjusted under 35 U.S.C. 154(b) by 0 days.

(21) Appl. No.: 14/708,192

(22) Filed: May 9, 2015

(65) Prior Publication Data

US 2016/0020806 A1 Jan. 21, 2016

(30) Foreign Application Priority Data

Jul. 21, 2014 (DE) .................... 20 2014 006 060 U

(51) Int. Cl.
*H04B 1/3883* (2015.01)
*H04M 1/04* (2006.01)
*H02J 7/00* (2006.01)
*G06F 1/16* (2006.01)

(52) U.S. Cl.
CPC ............ *H04B 1/3883* (2013.01); *G06F 1/1632* (2013.01); *H02J 7/0044* (2013.01); *H02J 7/0045* (2013.01); *H04M 1/04* (2013.01)

(58) Field of Classification Search
CPC ...... H04B 1/3883; H04M 1/04; H02J 7/0044; H02J 7/0045; G06F 1/1632
USPC ............................ 455/557; 320/115; 710/303
See application file for complete search history.

(56) References Cited

U.S. PATENT DOCUMENTS

2013/0219098 A1* 8/2013 Turnpenny .............. H04M 1/04
710/303

* cited by examiner

*Primary Examiner* — Raymond Dean
(74) *Attorney, Agent, or Firm* — Klaus J. Bach

(57) ABSTRACT

In a mobile telephone holder including a hollow support body with a mobile telephone accommodation area having a back support and a bottom support area formed by an upper housing part, the lower support area includes a number of installation locations for receiver blocks adapted to accommodate the connecting plugs for different mobile telephone models to be positioned so as to engage the respective mobile telephone jacks.

10 Claims, 4 Drawing Sheets

MOBILE TELEPHONE HOLDER WITH CHARGING FUNCTION

BACKGROUND OF THE INVENTION

The invention resides in a mobile telephone holder with a charging function which may be in the form of a table stand or, otherwise, for example, a wall mounted support for holding the mobile telephone while being charged.

Mobile telephones with charger plugs are well known. The telephones are provided with firmly installed charging plugs, Chargers are supplied as accessories for different mobile phone models in different forms. They are adapted with regard to shape and size as well as with respect to the installed charging plug to the respective mobile telephone models. A universal use of such telephone holders with charging function however is not possible since the numerous different mobile telephones have mostly charging plugs which differ in configuration size and positioning relative to the rear surface of the mobile telephones.

It is the object of the present invention to provide a mobile telephone holder which is usable in connection with at least several different telephone models with different charging plugs.

SUMMARY OF THE INVENTION

In a mobile telephone holder including a hollow support body with a mobile telephone accommodation area having a back support and a bottom support area formed by an upper housing part, the lower support area includes a number of installation locations for receiver blocks adapted to accommodate the connecting plugs for different mobile telephone models to be positioned so as to engage the respective mobile telephone jacks.

In this way, the mobile telephone holder according to the invention can be adapted to a plurality of mobile telephones with different charging plugs without the need for adapters in that the charging cable supplied with the mobile telephone is combined with, or integrated into, the mobile telephone holder. To this end, the telephone holder is provided with a support body in the form of a housing which consists of at least two housing parts and which can be opened by removing one housing part, for example a bottom cover, whereby access to the interior of the housing is provided. In the housing, a receptacle block is arranged which is removably fixed in the housing so as to retain a charger plug in a position in which it is inserted into the charger receptacle or jack of the respective mobile telephone placed into the mobile telephone holder. Preferably, a plurality of plug receiver blocks are provided which have the same shape and size but which have different receptacle openings for accommodating particular charging plugs wherein the receptacle block plug engagement openings are adapted in configuration size and location to the charging plug of the respective mobile telephone.

In this way, the universal mobile telephone holder according to the invention can be combined with the charging cable of the respective mobile telephone and the respective charging plug can be firmly mounted to the mobile telephone holder. The charging cable is accommodated in the interior of the housing and may extend through a rear cable opening in order to be plugged into an associated network device or with another connector plug to a power supply receptacle. The mobile telephone holder is inexpensive as it does not require an integral charging plug with the corresponding electrical components and wiring.

Such a mobile telephone holder may be for example in the form of a table stand or a wall mount for mounting to a wall surface for example to a rear wall of a desk, or it may be in any other form.

In an advantageous further embodiment, the mobile telephone holder is in the form of an insertion plug holder for insertion into a power supply receptacle or a USB jack of a laptop or similar. In this case, the rear area of the mobile telephone holder has an accommodation opening for receiving a power supply plug or a USB plug. The mobile telephone holder can then be combined with the charging cable in such a way that the charging plug is accommodated in the plug receptacle and retained therein while the network plug or USB plug at the other end of the charging cable is accommodated by the rear accommodation opening of the housing and the intermediate charging cable section is completely contained in the housing.

Such a mobile telephone holder in the form of a plug and receptacle arrangement may also be further developed in that, between the rear receptacle for a power supply or USB plug and the remaining support body for accommodating the mobile telephone, a joint is formed which permits pivoting of the support body carrying the mobile telephone relative to the rear area of the body accommodating the power supply or USB plug by about 90° in both directions about a vertical axis.

If the mobile telephone holder is then plugged into a power supply receptacle on a side wall for example in the area of a desk or a USB jack of a laptop, the support body carrying the mobile telephone can be pivoted toward the user so that the display of the mobile telephone faces the user and is easily visible and also operable while it remains disposed on the holder.

If the mobile telephone is provided with a USB plug for insertion into a USB jack of a laptop, an assortment of several different bottom covers of various heights or an assortment of distance plates and/or support plates for example of foam rubber of different thicknesses may be provided for height compensation so that the mobile telephone holder is supported on the table at the proper height to permit insertion of the USB plug into the USB jack of the laptop without the plug or USB jack being damaged by the weight of the mobile telephone and for providing stable support for the mobile telephones.

Advantageous embodiments and further developments of the invention will become more readily apparent from the following description of preferred embodiments with reference to the accompanying drawings.

DESCRIPTION OF PARTICULAR EMBODIMENTS

Figure 1:
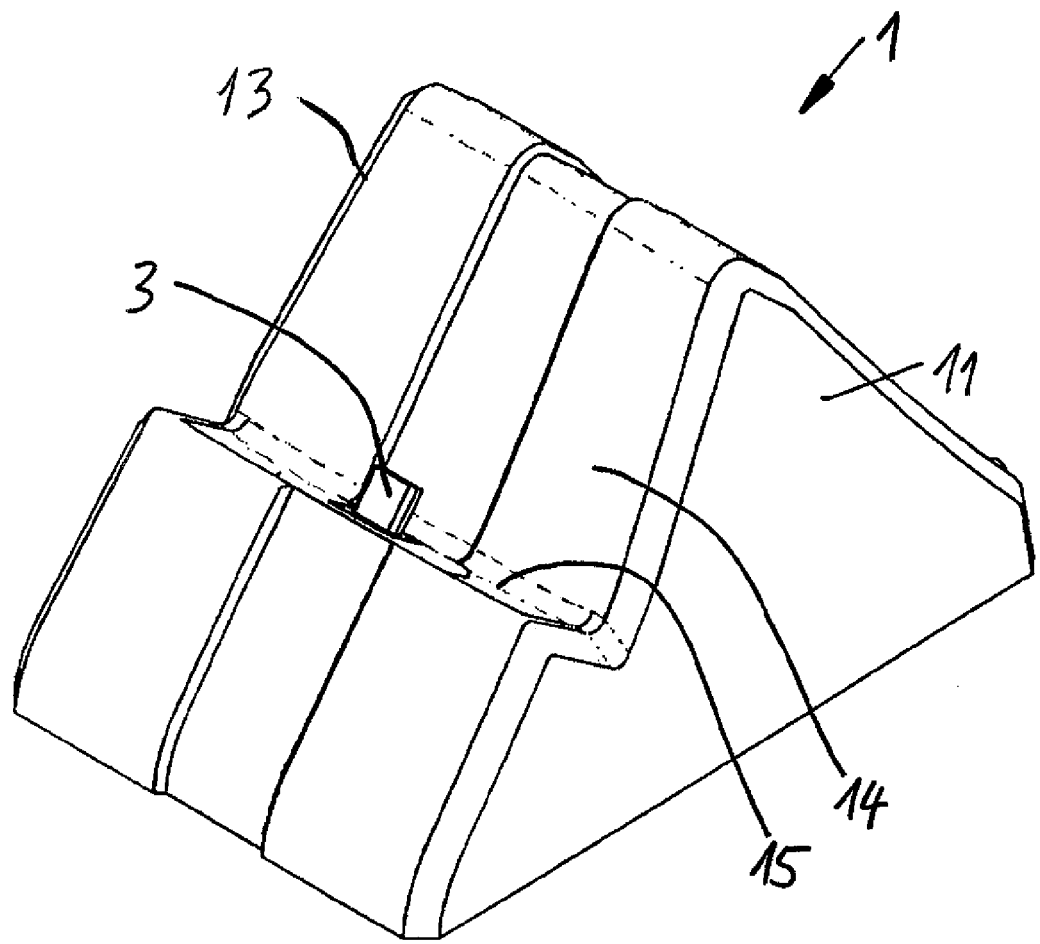
FIG. 1 is a perspective view of a mobile telephone holder for placement on a table or desk.
Figure 2:
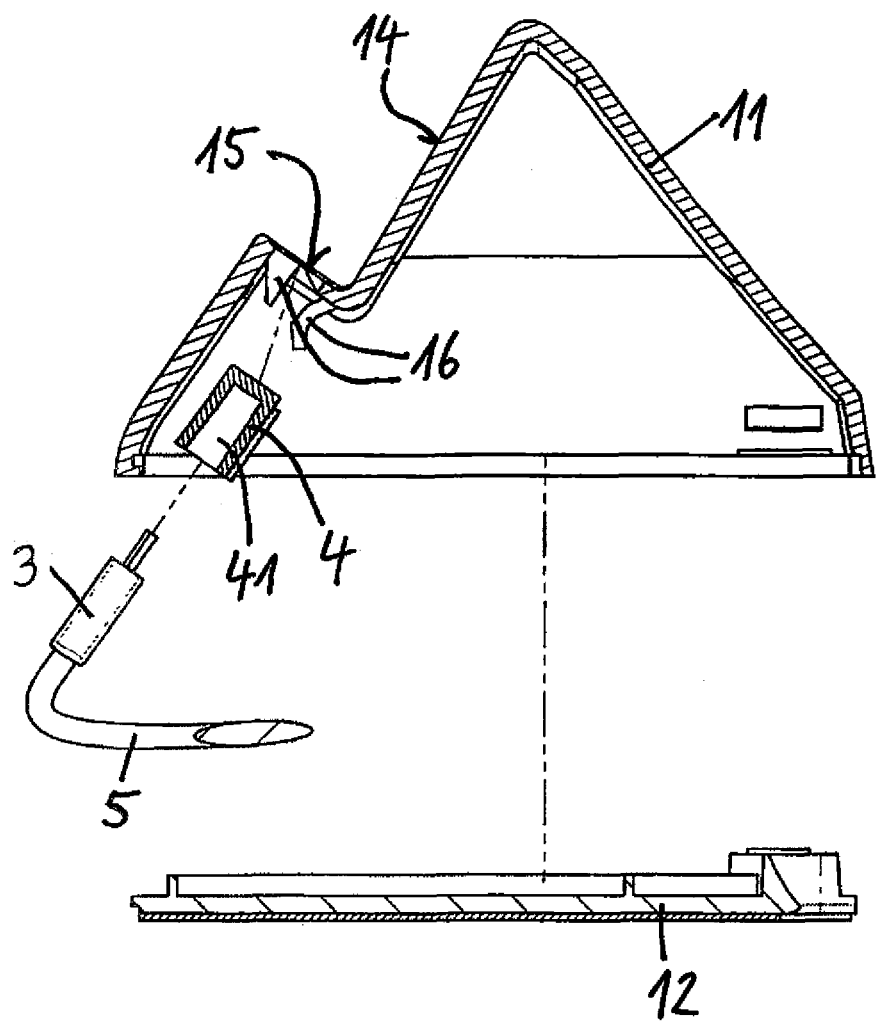
FIG. 2 is a cross-sectional view of the mobile telephone holder shown in FIG. 1.

The mobile telephone holder according to the invention as shown in FIGS. 1 and 2 is in the form of a table stand and has a support body 1 which is a housing that is a hollow body consisting of an upper part 11 and a removable bottom part 12. The bottom part 12 and the upper part 11 are provided with cooperating form-locking engagement structures so that they can be releasably joined. The upper part 11 has a support area 13 for accommodating a mobile telephone defined by an inclined back support surface 14 for holding the mobile telephone and a bottom support surface 15 which extends normal to the back support surface 14 and from which a charging plug 3 projects which, with the mobile telephone placed into the support area 13, extends into the charging jack of the mobile telephone.

The exploded view of FIG. 2 shows the design details of the support body. The upper part 11 includes a jack block 4 which is arranged below the support surface 15 and which accommodates and retains the charging plug 3. To this end, the upper part 11 is provided with a guide and engagement structure 16 of complementary elements on the plug accommodation block 4 for guiding the accommodation block 4 with the charging plug 3 in the upper part 11 in such a way that it is removably locked in the upper part 11.

The accommodation block 4 has an opening 41, which, with respect to configuration, size and positioning relative to the support surface 14, is adapted to the respective charging plug 3 of the particular mobile telephone, so that the charging plug 3 is properly positioned when disposed in the accommodation block 4 and, together with the accommodation block installed in the upper part such that, upon deposition of a respective mobile telephone on the support body 1, the charging plug 3 is inserted into the charging jack of the mobile telephone.

The charging plug 3 is actually not part of the telephone holder, but is the charging plug of the accessories of the mobile telephone, that is, it is part of the charging cable which is combined with the mobile telephone holder according to the invention.

The bottom part 12 of the telephone holder can be removed from the upper part 11 for the installation, the removal or the exchange of the accommodation block 4, whenever a charging cable with a charging plug 3 is to be installed or the mobile telephone model and the charging cable is exchanged. When installed the charging cable extends through the interior of the housing which, at the rear area thereof is provided with a penetration opening (not shown) for the charging cable 5.

Figure 3:
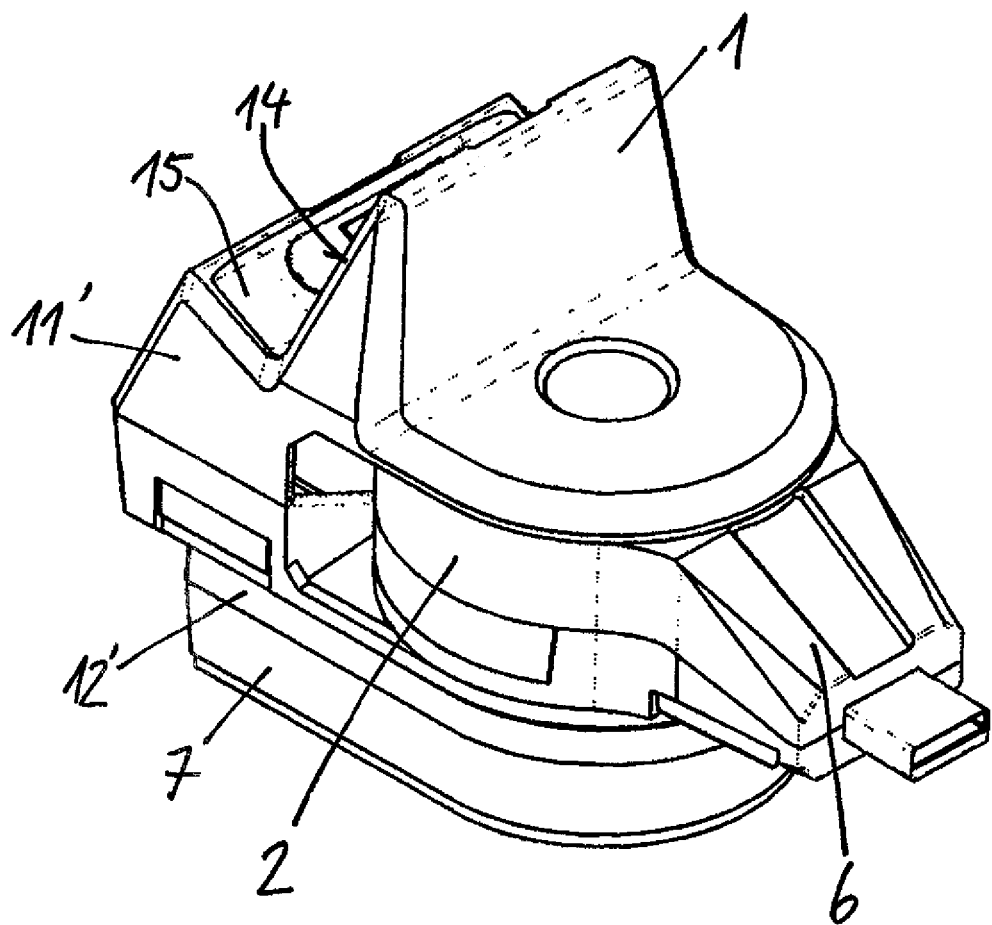
FIG. 3 shows a mobile telephone holder with a USB plug in a perspective view.
Figure 4:
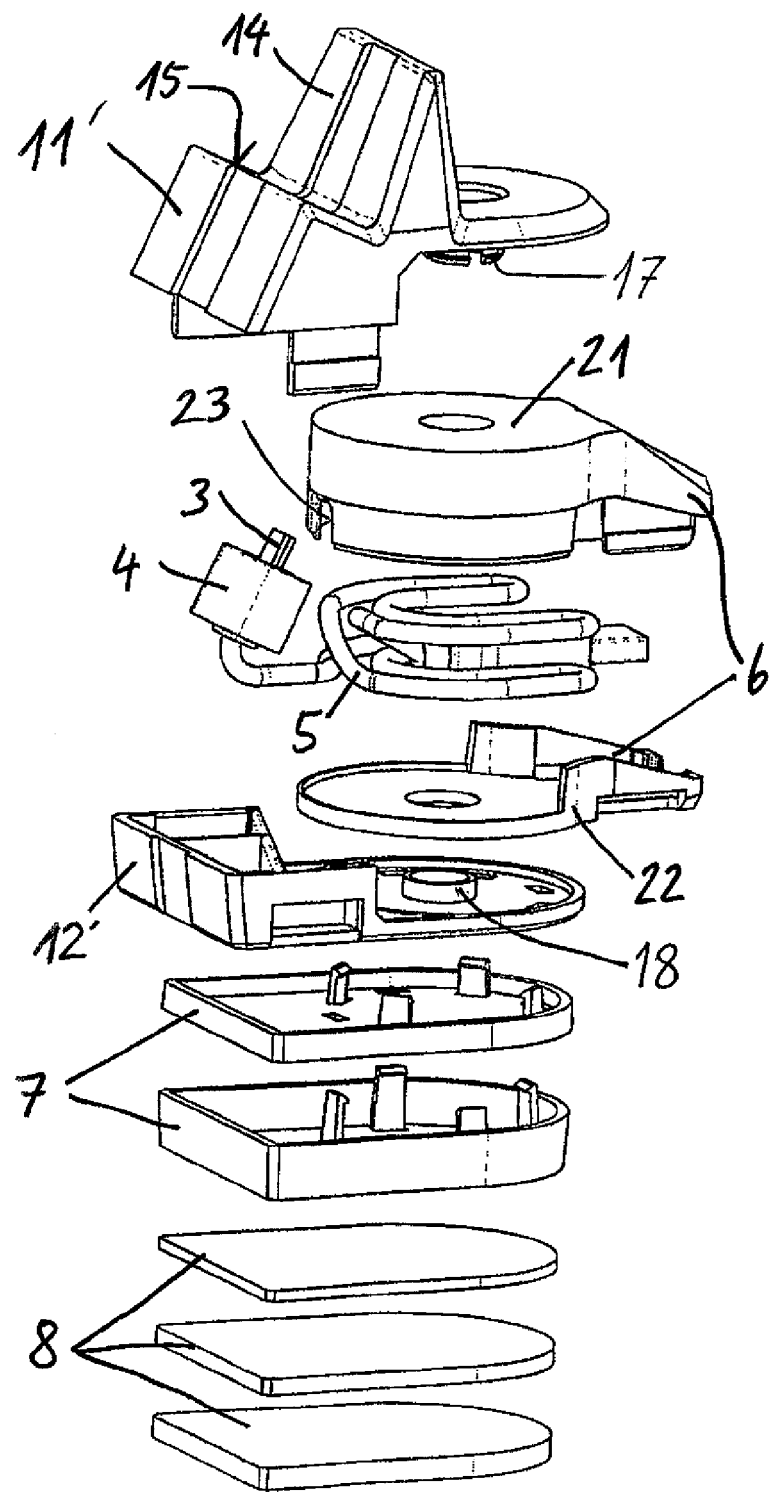
FIG. 4 shows the mobile telephone holder of FIG. 3 in an exploded view.

FIGS. 3 and 4 show an embodiment of the mobile telephone holder according to the invention in the form of a plug-in device for insertion into a power supply receptacle or a USB jack wherein the support body for holding the mobile telephone is pivotable relative to the power supply or USB plug arranged in the rear in both directions by about 90° about a vertical axis. FIG. 3 is a perspective view and FIG. 4 shows the telephone holder of FIG. 3 in an exploded view which shows the various parts of the telephone holder.

The support body 1 of the mobile telephone holder according to FIGS. 3 and 4 for accommodating the mobile telephone has the same basic shape as that of the FIGS. 1 and 2 embodiment. The upper part of the housing formed by the support body is again designated by the reference numeral 11' while the bottom part is designated by the numeral 12'. In the upper part 11', a charger plug 3 is installed via a plug accommodation block 4 like in the embodiment of FIGS. 1 and 2. A charging plug 3 is installed utilizing a plug accommodation block 4.

In the embodiment according to FIGS. 2 and 3, the rear area of the mobile telephone holder is provided with an adapter structure 6 for a USB plug, but this structure may also be in the form of a power supply plug. This USB plug adapter structure 6 is provided at its rear end with a hinge part 2, which comprises a top part 21 and a bottom part 22 and which parts together form a housing in which the charging cable length between the charging plug 3 and the USB jack is accommodated. From the exploded view of FIG. 3, this is clearly apparent. The hinge part 2 has an opening 23 through which the end section of the charging cable provided with the charging plug 3 extends. The hinge part 2 itself is disposed between the hinge elements 17 and 18 which are parts of the top part 11', and respectively the bottom part 12', so that the support body 1 is pivotable relative to the hinge part 2 about a vertical axis in both directions by about 90°.

The top part 21 and the bottom part 22 as well as the top part 11' and the bottom part 12' of the support body are interlocked.

As it can be further seen from FIG. 4, spacer plates 7 of different thickness may be provided which can be attached selectively to the bottom side of the lower housing part 12' of the support body 1 for adjusting the height of the USB plug to a level as required for its insertion into the USB jack when the support body 1 is disposed on the same table surface as the laptop. Additionally, or alternatively, to the spacer plates 7 plate-like supports 8 of different thickness may be selectively used. These supports may be for example cemented to the bottom side of the lower housing part 12' where they provide for height adjustment. It is also possible to provide an assortment of bottom parts 12' of different heights which can be selectively used.

When above charging cables with charging plugs are mentioned, those may instead also be data cables and data plugs or combined charging/data cables or charging/data plugs provided it does not concern embodiments with power supply plugs for insertion into power supply receptacles.

What is claimed is:

1. A mobile telephone holder including support body having an accommodation area for a mobile telephone with a back support surface area and a lower support area for supporting a mobile telephone, the support body being hollow for the accommodation of data or power supply cables, the support body consisting at least of an upper part forming the accommodation area and a bottom part, the lower support area including a mounting structure for fixedly engaging a plug accommodation block in an opening having a configuration and size adapted to engage a plug of a particular mobile telephone cable, the plug-accommodating block being exchangeable and the lower support area having a number of installation locations permitting the installation of the accommodation block at different locations as required for insertion of the plug of the mobile telephone cable of a particular mobile telephone model into a respective mobile telephone jack.

2. The mobile telephone holder according to claim 1, wherein the upper housing part mounting structure includes clamping means for releasably engaging the accommodation block.

3. The mobile telephone holder according to claim 1, wherein the bottom housing part is removably attached to the upper housing part.

4. The mobile telephone holder according to claim 1, wherein the support body is provided with a rear cable passage.

5. The mobile telephone holder according to claim 1, wherein the upper housing part has at the rear thereof a receptacle for accommodating at least one of a power and a data supply plug.

6. The mobile telephone holder according to claim 5, wherein the receptacle for accommodating the at least one of a power and a data supply plug is pivotally mounted to the support body by a pivot joint so as to permit pivoting of the receptacle about a vertical axis.

7. The mobile telephone holder according to claim 6, wherein the pivot joint is in the form of a housing and the cable extends through that housing.

8. The mobile telephone holder according to claim 7, wherein the pivot joint housing comprises a top and a bottom part which are releasably joined.

9. The mobile telephone holder according to claim 6, wherein height adjusting plates of different heights are provided which are selectively connectable to the bottom side of the support body.

10. The mobile telephone holder according to claim 9, wherein an assortment of support plates of foamed rubber or another material of different thicknesses are provided for attachment to the bottom plate for position level adjustment of the support body.

\* \* \* \* \*